(12) United States Patent
Gaste et al.

(10) Patent No.: US 11,178,206 B2
(45) Date of Patent: Nov. 16, 2021

(54) METHOD FOR MANAGING PROGRESSIVE AND ADAPTIVE STREAMING OF DIGITAL CONTENT BY A MULTIMEDIA STREAM PLAYER TERMINAL CONNECTED TO A COMMUNICATION NETWORK, AND ASSOCIATED MANAGEMENT DEVICE, MULTIMEDIA STREAM PLAYER TERMINAL AND COMPUTER PROGRAM (71) Applicant: ORANGE, Issy-les-Moulineaux (FR)

(72) Inventors: Olivier Gaste, Chatillon (FR); Hervé Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/136,419

(22) Filed: Dec. 29, 2020

(65) Prior Publication Data

US 2021/0211485 A1    Jul. 8, 2021

(30) Foreign Application Priority Data

Jan. 2, 2020 (FR) ...................................... 2000002

(51) Int. Cl.
*H04L 29/06* (2006.01)
*H04L 12/26* (2006.01)

(52) U.S. Cl.
CPC .......... *H04L 65/80* (2013.01); *H04L 43/0888* (2013.01); *H04L 65/4092* (2013.01); *H04L 65/602* (2013.01); *H04L 65/607* (2013.01)

(58) Field of Classification Search
CPC ... H04L 65/80; H04L 43/0888; H04L 65/607; H04L 65/602; H04L 65/4092
See application file for complete search history.

(56) References Cited

U.S. PATENT DOCUMENTS 9,942,557 B2 *  4/2018  Carmel ................ H04N 19/176
2013/0117415 A1 *  5/2013  Gilson ............. H04N 21/47214
709/219

(Continued)

OTHER PUBLICATIONS

French Search Report and Written Opinion dated Apr. 30, 2020 for corresponding French Application No. 2000002, filed Jan. 2, 2020.

(Continued)

*Primary Examiner* — Oanh Duong
(74) *Attorney, Agent, or Firm* — David D. Brush; Westman, Champlin & Koehler, P.A.

(57) ABSTRACT

A method for managing progressive and adaptive streaming of digital content within a multimedia stream player terminal connected to a communication network, the digital content being associated with a description file of the digital content, which includes a list of time segments of the content each associated with several encoding bit rates or qualities of the content. The method implements: obtaining a connection speed to the communication network determined from a size and a streaming time of at least one already streamed time segment, and selecting, for at least one subsequent time segment to be streamed, a maximum quality of the content, depending on the connection speed and a ratio, called a gain factor, between an actual encoding bit rate of the already streamed time segment and the quality associated with the time segment in the description file.

11 Claims, 5 Drawing Sheets

(56) References Cited

U.S. PATENT DOCUMENTS

| | | | |
|---|---|---|---|
| 2015/0023404 A1* | 1/2015 | Li .................... | H04N 19/152 375/240.02 |
| 2015/0244636 A1 | 8/2015 | Zhou et al. | |
| 2016/0366202 A1* | 12/2016 | Phillips ............... | H04L 65/602 |
| 2017/0055012 A1* | 2/2017 | Phillips .............. | H04N 21/2402 |
| 2017/0134465 A1 | 5/2017 | Caballero et al. | |
| 2017/0188056 A1 | 6/2017 | Do et al. | |
| 2018/0309809 A1 | 10/2018 | Sen et al. | |
| 2019/0166170 A1* | 5/2019 | Ramaswamy ..... | H04N 21/2358 |
| 2020/0236372 A1* | 7/2020 | Reznik ............... | H04N 19/162 |

OTHER PUBLICATIONS

English translation of the Written Opinion dated Apr. 30, 2020 for corresponding French Application No. 2000002, filed Jan. 2, 2020.

* cited by examiner

METHOD FOR MANAGING PROGRESSIVE AND ADAPTIVE STREAMING OF DIGITAL CONTENT BY A MULTIMEDIA STREAM PLAYER TERMINAL CONNECTED TO A COMMUNICATION NETWORK, AND ASSOCIATED MANAGEMENT DEVICE, MULTIMEDIA STREAM PLAYER TERMINAL AND COMPUTER PROGRAM

TECHNICAL FIELD OF THE INVENTION

The field of the invention is that of digital multimedia content, namely digital audio and/or video content, and more particularly digital multimedia content obtained using a technique known as progressive and adaptive streaming within a communication network.

More specifically, the invention relates to the management of progressive and adaptive streaming of digital content within a multimedia stream player terminal connected to said communication network.

PRIOR ART

Access to digital multimedia content, such as television or video-on-demand, from an Internet-type network, is possible today for most client terminals, particularly when they belong to a local communication network, such as a domestic network.

The terminal generally issues a request to a server, indicating the chosen content, and receives in return a stream of digital data relating to this content. In a local communication network, such a request transits through the network access gateway, for example the residential gateway.

The terminal is adapted to receive this digital content in the form of multimedia data and to restitute it. This restitution consists in providing the digital content at the terminal level in a form accessible to the user. For example, received data corresponding to a video are usually decoded and then restituted at the terminal level as a display of the corresponding video with its associated soundtrack. In the following, for purposes of simplification, the digital content will be assimilated to a video and the restitution by the terminal, or the consumption by the user of the terminal, to a viewing or playing on the screen of the terminal.

The broadcast of digital content on the Internet is often based on client-server protocols of the HTTP (Hyper Text Transfer Protocol) family. In particular, the streaming in progressive mode of digital content, also known as streaming, makes it possible to transport and consume the data in real time, that is, the digital data is transmitted over the network and restituted by the terminal as it arrives. The terminal receives and stores one part of the digital data in a buffer memory before restituting it. This distribution mode is particularly useful when the bit rate available to the user is not guaranteed for the real-time transfer of the video.

HTTP adaptive streaming, abbreviated as HAS, also makes it possible to broadcast and receive data in different qualities corresponding for example to different encoding bit rates. These different qualities are described in a parameter file available for streaming on a data server, for example a content server. When the client terminal wants to access content, this description file is used to select the appropriate format for the content to be consumed depending on the available bandwidth or the storage and decoding capacities of the client terminal. This type of technique notably allows to take into account the bandwidth variations on the link between the client terminal and the content server.

Several technical solutions are available to facilitate the distribution of such content, such as the proprietary solutions Microsoft® Smooth Streaming, Apple® HLS, Adobe® HTTP Dynamic Streaming or the MPEG-DASH standard of the ISO/IEC organisation, that will be described below. These methods propose to send the customer one or more intermediate description files, also called documents or manifests, containing the addresses of the different segments with the different qualities of the multimedia content.

Thus, the MPEG-DASH (Dynamic Adaptive Streaming over HTTP) standard is a format standard for audio/video broadcasting on the Internet. It is based on the preparation of the content in different presentations of varying quality and bit rate, split into short time segments (in the range of a few seconds), also called "chunks". Each of these time segments is made available individually by means of an exchange protocol. The protocol mainly targeted is HTTP, but other protocols (FTP, for example) can also be used. The arrangement of the segments and the associated parameters are published in a description file or manifest in XML format.

The underlying principle of this standard is that the MPEG-DASH client estimates the bandwidth available for receiving segments and, depending on the amount of a reception buffer memory used, selects for the next segment to be loaded a representation with a bit rate that:
  ensures the best possible quality,
  and allows a reception time compatible with the uninterrupted rendering of the content.

Thus, to adapt to changing network conditions, particularly in terms of bandwidth, existing adaptive streaming solutions allow the client terminal to switch from one version of the content encoded at a certain bit rate to another encoded at another bit rate during streaming. Indeed, each version of the content is split into time segments of equal length. In order to allow a continuous restitution of the content on the terminal, each segment must reach the terminal before its scheduled restitution time. The perceived quality associated with a segment increases with the size of the segment, expressed in bits, but at the same time, larger segments require more transmission time, and therefore present an increased risk of not being received in time for a continuous restitution of the content.

The client terminal must therefore find a compromise between the overall quality of the content, and its uninterrupted restitution, by carefully selecting the next segment to be streamed, from the different proposed encoding bit rates. To do this, there are different algorithms for selecting the quality of the content depending on the available bandwidth, which may have more or less aggressive or more or less secure strategies.

In other words, in order to ensure a certain smoothness during playback, if the available bandwidth does not give access to the best quality proposed in the manifest, the client terminal will use lower quality data streams. This technique thus makes it possible to propose the best possible video quality while ensuring a smooth playback or viewing of the digital content.

The consumption of digital content through HTTP adaptive streaming HAS tends to become more popular. In particular, it is used by many streaming services, but also by certain TV decoders or set-top-boxes, that use it to access delinearised content, such as video on demand (VOD), replay of television programmes, or Network PVR (Personal Video Recorder) offerings, i.e. a service for recording digital content, implemented by the content provider itself rather than at the end user's home.

Furthermore, other devices such as real-time multimedia stream player devices also access digital content in HTTP adaptive streaming mode for live television content. It is the case, for example, of the Chromecast® device developed by Google®, or the Orange® Clé TV®. Such devices typically connect to the HDMI port of a television set and communicate, via a Wi-Fi® connection, with another device of the domestic communication network connected to a wide Internet-type communication network (residential gateway, computer, smartphone, tablet, etc.), in order to restitute, on the television set, the multimedia content received by a compatible software application. These devices will hereafter be referred to as HDMI keys.

In the following, for purposes of simplification, the term "client terminal" will be assimilated to the association of a multimedia stream player terminal (HDMI key, for example) and a restitution terminal (a television set, for example) allowing the content to be viewed. It will be noted that the restitution terminal can be the multimedia stream player terminal itself (for example, a smartphone or a tablet) or be separate from it (for example, a television set connected to an HDMI key, or to a set-top box (STB)).

There are several methods for encoding digital content. A first method consists in encoding the digital content at a constant bit rate or CBR where all the encoded time segments have the same size. A disadvantage of this method is that it allocates the same encoding bit rate to any type of scene, whether it contains a large amount of movement or not, and therefore independently of its actual needs in terms of bit rate. With this method, the different encoding bit rates, or qualities, associated with the time segments in the description file correspond to different values of encoding constant bit rates CBR. As a result, the quality of the user experience can be disappointing on digital content with action scenes, for an overall high bandwidth consumption.

A second method is also known, that applies an encoding variable bit rate or VBR to the digital content, where the time segments are encoded at an average bit rate (ABR) without exceeding a predetermined peak cell rate PCR. One advantage of this method is that it can adapt the encoding bit rate to the digital content, for example, allocate more bit rate to an action scene than to a scene with little movement. According to this second method, the different encoding bit rates, or qualities, associated with the time segments in the description file can either correspond to the encoding average bit rate ABR values of each available version, or correspond to the encoding peak cell rate PCR values of each available version. When encoding average bit rates ABR are indicated in the description file, the client can select a segment which effective encoding bit rate will be higher than the indicated average bit rate. The focus is therefore on improving the quality of the streamed digital content, and thus the user experience, bandwidth consumption being approximately the same as for the first method CBR. However, when peak cell rates PCR are indicated, since all the time segments will benefit at best from an encoding bit rate lower than the peak cell rate PCR of their version, the focus is on reducing the bandwidth consumption, in favour of the service provider, at the expense of the quality of the digital content streamed by the customer.

For example, a progressive and adaptive streaming service provider that wants to replace a progressive and adaptive streaming solution based on a encoding constant bit rate CBR with a solution based on an encoding variable bit rate VBR faces with a difficult strategic choice between proposing their customers an enhanced offering and saving network resources.

There is therefore a need for a technique for managing progressive and adaptive streaming of digital content that allows a service provider to optimise the bandwidth consumption of this service, without prejudice to the quality of the user experience.

Furthermore, there is a need for a technique that adapts more finely to the user's bandwidth, taking advantage in particular of the technical specificities of progressive and adaptive streaming.

The invention improves the situation.

DISCLOSURE OF THE INVENTION

The invention addresses this need by proposing a method for managing progressive and adaptive streaming of digital content within a multimedia stream player terminal connected to a communication network, said digital content being associated with a description file of said digital content, comprising a list of time segments of said content each associated with several encoding bit rates corresponding to several qualities, said encoding bit rate being associated for said quality with a resolution of said content.

Said method comprises:
 obtaining a connection speed to the communication network, determined from a size and a streaming time of at least one already streamed time segment, and
 selecting, for at least one subsequent time segment to be streamed, a maximum quality of the content, depending on the connection speed and a ratio, called a gain factor, between an actual encoding bit rate of said already streamed time segment and an encoding bit rate corresponding to the quality associated with said time segment in the description file.

Thus, the invention is based on a completely new and inventive approach to the management of progressive and adaptive streaming of digital content within a multimedia stream player terminal connected to a communication network. More particularly, the invention provides a new mode for selecting the quality of a time segment to be streamed, that takes into account not only the connection speed to the network of the player terminal, but also a ratio between the actual encoding bit rate of at least one already streamed time segment and its quality indicated in the description file. Thus, if the actual encoding bit rate of one or more already streamed time segments turns out to be lower than their theoretical encoding bit rate, the invention allows the user to benefit from this for the next time segment to be streamed, by selecting a higher quality than the one they would have chosen based on the connection speed alone. In this way, the invention achieves a finer management of progressive and adaptive streaming of content that allows the user to access the best possible quality.

According to an aspect of the invention, the connection speed is compared with a predetermined threshold and the selection step is executed if the connection speed is below said predetermined threshold.

The implementation of the new mode for selecting the quality of a subsequent time segment to be streamed is thus conditioned by the positioning of the connection speed of the player terminal to the communication network in relation to a predetermined threshold. More precisely, the invention proposes to trigger it when this connection speed is below this threshold.

In this way, users with low connection speeds, who generally can only access a low-quality version of the digital content, benefit from the new selection mode proposed by the invention and thus stream content with an improved level of quality. The impact of the invention on their user experience is immediately perceptible and positively felt.

Advantageously, the predetermined threshold is set to a value that distinguishes a first group of users subscribing to low-speed ADSL or more generally via a low-speed network access technology, from a second group of users subscribing to high-speed ADSL or even better to fibre, who already access the maximum available quality for streaming digital content. For example, the predetermined threshold is chosen equal to 5 Mbps.

According to another aspect of the invention, if the connection speed is higher than the predetermined threshold, the method comprises selecting a maximum quality of the content depending on the connection speed alone.

For users who benefit from a good network connection and already access content of very acceptable or even maximum quality, the new selection mode is not implemented, which allows the service provider to save bandwidth without prejudice to their user experience.

According to another aspect of the invention, selecting a quality for at least one subsequent time segment to be streamed further comprises, when the connection speed is below said predetermined threshold:
  weighting the qualities associated with the time segments in the description file by the gain factor;
  comparing the weighted qualities with the connection speed, the quality of which the weighted value is both lower than and closest to the connection speed being chosen.

According to yet another aspect of the invention, the method comprises averaging the gain factor over a plurality of successively streamed time segments.

One advantage is to smooth the value of the gain factor to make it less sensitive to bit rate differences between two consecutive time segments. A smoothed gain factor thus provides more stability to the streaming management algorithm by avoiding inopportune jumps from one quality to another.

According to yet another aspect of the invention, said digital content is encoded with a encoding variable bit rate and said theoretical encoding bit rate associated with a time segment in the description file is an allowed peak cell rate.

The invention is particularly applicable to HTTP adaptive streaming mode with a variable bit rate VBR, according to which the description file associates to the time segments a quality indication corresponding to their encoding peak cell rate PCR. Indeed, in this case, the production tests carried out on live video content show a gain factor of an average value of ½. The actual encoding bit rate measured for the time segments is therefore lower than the encoding peak cell rate PCR by approximately 50%. One advantage of the new mode for selecting a quality according to the invention is that the user of the streaming service can benefit from this margin. The quality restituted to the user is therefore better for an unchanged bandwidth consumption compared to a fixed bit rate CBR streaming mode.

According to yet another aspect of the invention, said digital content is encoded with an encoding fixed bit rate and the qualities associated with a time segment in the description file are encoding average bit rates.

One advantage of the invention is that it also applies to a constant bit rate CBR streaming in progressive mode, according to which the description file associates to the time segments a quality indication corresponding to their encoding average bit rate ABR. Indeed, in this second case, the gain factor will be about 1, so that the invention will not impact the result of the selection, which will be unchanged compared to that of the prior art. One interest of the invention is its versatility. It is therefore unnecessary to provide for a prior test for detecting the streaming mode used before executing the invention, since the invention adapts to it natively.

According to yet another aspect of the invention, said digital content is encoded with an encoding variable bit rate and the qualities associated with a time segment in the description file are encoding average bit rates.

One advantage of the invention is that it also applies to a variable bit rate VBR streaming in progressive mode, according to which the description file associates to the time segments a quality indication corresponding to their encoding average bit rate ABR instead of the allowed peak cell rate PCR. In this configuration, the service provider chooses not to reduce the network load, but only to improve the quality of the content restituted to the customer, where possible. Indeed, it may happen that the gain factor takes on values greater than 1, especially for a time segment corresponding to a very animated scene, which is costly to encode. As a result, the application of this gain factor to the qualities indicated in the manifest may have the effect of increasing them and the quality actually selected would be lower than the one that would have been selected by a conventional selection mode. This avoids blocking the playback of the digital content, which ensures its smoothness. Indeed, for a smooth restitution, the player terminal should not take longer to stream the time segments than it takes to play them. Yet, the segments encoding an animated scene take longer to stream than the average and take up more of the player terminal's buffer memory. The control provided by the invention thus makes it possible to preserve the quality of the restitution and thus of the user experience.

The invention also relates to a computer program product comprising program code instructions for implementing a method for managing HTTP adaptive streaming of digital content within a multimedia stream player terminal connected to a communication network according to the invention, as described previously, when it is executed by a processor.

The invention also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be streamed in particular on a network, for example the Internet network. Alternatively, the storage medium can be an integrated circuit in which the program is embedded, the circuit being adapted to execute or to be used in the execution of the above-mentioned management method.

The invention also relates to a device for managing progressive and adaptive streaming of digital content within a multimedia stream player terminal connected to a communication network, said digital content being associated with a description file of said digital content, comprising a list of time segments of said content each associated with several encoding bit rates corresponding to several qualities, said encoding bitrate being associated for said quality with a resolution of said content. Said device is configured to:

obtain a connection speed to the communication network from a size and a streaming time of at least one already streamed time segment, and select, for at least one subsequent time segment to be streamed, a maximum quality of the digital content, depending on the connection speed and a ratio, called a gain factor, between an actual encoding bit rate of said already streamed time segment and an encoding bit rate corresponding to the quality associated with said time segment in the description file.

Advantageously, said device is configured to implement the method for managing HTTP adaptive streaming of an above-mentioned digital content, according to its different embodiments.

Advantageously, said device is integrated in a multimedia stream player terminal, configured to connect to a communication network and to decode a multimedia stream. It is for example a TV decoder, for example of type HDMI key, connected to a television set or a user terminal, such as a smartphone, tablet or computer.

The above-mentioned associated multimedia stream player terminal, device for managing HTTP adaptive streaming of digital content and computer program have at least the same advantages as those provided by the above-mentioned method according to the different embodiments of the present invention.

BRIEF DESCRIPTION OF THE FIGURES

Other purposes, features and advantages of the invention will become more apparent upon reading the following description, hereby given to serve as an illustrative and non-restrictive example, in relation to the figures, among which.

DETAILED DESCRIPTION OF THE INVENTION

The general principle of the invention is based on the estimation by the multimedia stream player terminal of a connection speed to the communication network and the selection of a quality of a subsequent time segment of the digital content to be streamed depending not only on this connection speed, but also on a ratio, called a gain factor, between an actual encoding bit rate measured by the player terminal and the quality of the digital content associated with the time segment in the description file.

Advantageously, this new mode for selecting a quality for the next time segment to be streamed is triggered when the user's connection speed to the network is below a predetermined threshold. In relation to FIG. 1, a progressive and adaptive streaming architecture in a domestic network based on the use of adaptive streaming according to the invention is now described.

Figure 1:
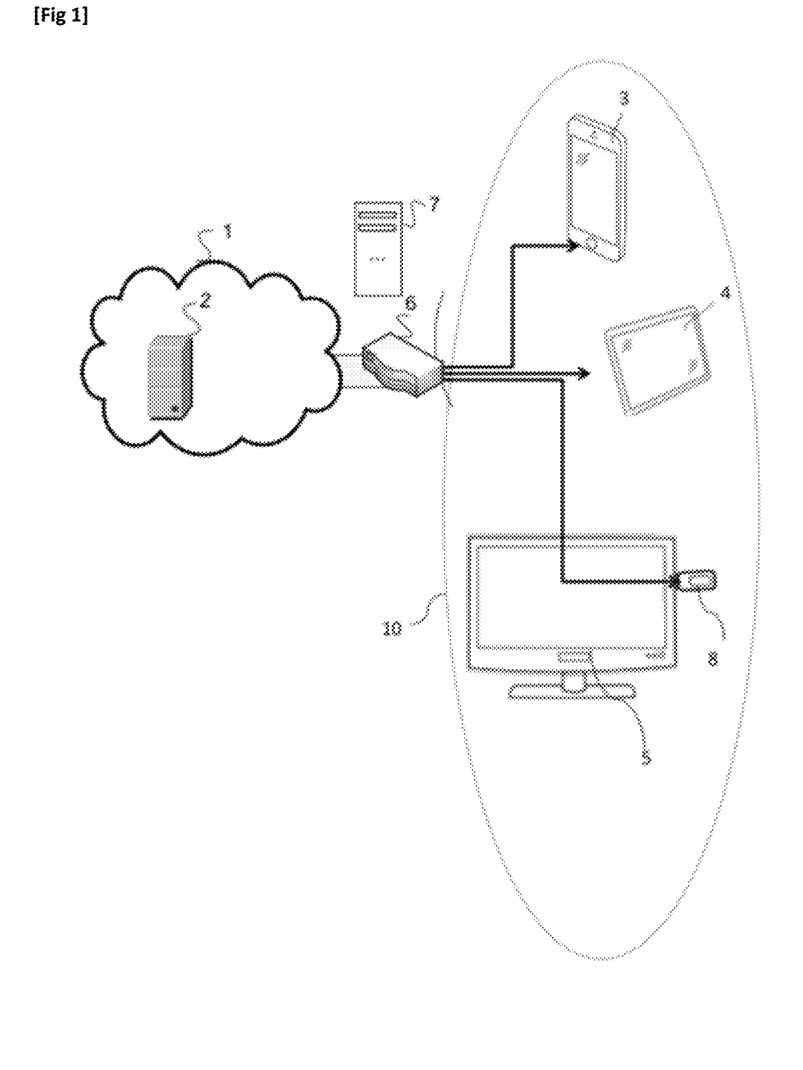
FIG. 1: shows an example of a progressive and adaptive streaming architecture on a domestic network based on the use of adaptive streaming according to one embodiment of the invention.

In this example, the terminal 3, for example a smartphone, the terminal 4, for example a tablet, and the terminal 8, for example a TV decoder such as an HDMI key connected to a television set 5, are located in a local area network (LAN, 10) controlled by a home gateway 6. The context of the local area network is given as an example and could easily be transposed to a "best effort" type Internet network, a corporate network, etc.

According to this example, an HAS digital content server 2, or content server 2, is located in the wide area network (WAN, 1), but it could indifferently be located in the local area network (LAN, 10), for example in the home gateway 6 or any other equipment able to host such a content server. The content server 2 receives, for example, digital television content channels from a broadcast television network, not shown, and makes them available to the client terminals.

The client terminals 3, 4 and the HDMI key 8, in association with the television set 5, can communicate with the content server 2 to receive one or more items of content (films, documentaries, commercials, etc.).

In this client-server context, an HTTP-based adaptive streaming HAS technique is often used for exchanging the data between the terminals 3, 4 and 8 and the content server 2. This type of technique notably offers the user a good quality of content by taking into account the bandwidth variations that may occur on the link between its client terminal 3, 4 and 8 and the services gateway 6, or between the latter and the content server 2.

Typically, different qualities can be encoded for the same digital content, corresponding for example to different bit rates. More generally, quality refers to a certain resolution of the digital content (spatial, temporal resolution, quality level associated with video and/or audio compression) associated with a certain encoding bit rate. Each version of the digital content encoded at a particular quality level is itself split by the content server into time segments (or content fragments, or "chunks", these three words being used interchangeably throughout this document).

The description of the different versions available for a given digital content, as well as the actual time segments, are made available to the stream player terminal. All this information (qualities, size and Internet address, for example in the form of an URI (Universal Resource Identifier) type address of the time segments, etc.) is generally grouped in a parameter file, called a description file or a manifest. It will be noted that this parameter file can be a computer file or a set of descriptive information of the content, accessible at a certain address.

The terminals 3, 4 and 8 have their own characteristics in terms of display, decoding capacity, etc. In the context of HTTP adaptive streaming, they can adapt their requests to receive and decode the content requested by the user at the quality that best suits them. In our example, if the content is available at bit rates of 1,000 kbps (kilobits per second) (quality 1, or level 1, denoted D1), 2,500 kbps (D2), 5,000 kbps (D3), 7,500 kbps (D4) and if the client terminal has a 10,000 kbps bandwidth, it can request any version of the digital content as long as its bit rate is below this limit, for example 5,000 kbps. In general, the time segment number i with the quality j (for example the j-th quality level Dj described in the description file) of the content C is noted as "Ci@Dj".

The service gateway 6 is in this example a home gateway that provides data routing between the wide area network 1 and the local area network 10 and manages digital content notably by ensuring their reception from the wide area network 1.

The terminals 3, 4 and 8 receive the data from the wide area network 1, via the home gateway 6, and decode them, and possibly restitute them on their own display device or screen, or in the example of the HDMI key 8 on the associated television set 5. In a variant, the terminals 3 and 4 transmit this data to the HDMI key 8 for restitution on the screen of the television set 5. In another variant, the decoder can be located at another point of the wide area network 1 or local area network 10, such as a set-top-box STB (not shown) associated with a television set 5.

In the example of FIG. 1, to view a content, the terminals 3, 4 or 8 first query the service gateway 6 to obtain an address of the description document 7 of a desired digital content C. The service gateway 6 responds by providing the terminal with the address of the description file 7. In the following, it is assumed that this file is a manifest type file according to the MPEG-DASH standard (noted as "C.mpd") and it will be called indifferently, depending on the context, a "description file" or a "manifest".

Alternatively, this file can be retrieved directly from an Internet server that is local or external to the local area network, or, when it has already been obtained, from the service gateway or on the terminal.

A manifest file or MPD example, compliant with the MPEG-DASH standard, and comprising the description of the available content C1 and C2 in three different qualities (N1=512 kbps, N2=1,024 kbps, N3=2,048 kbps) of the fragmented content is presented in Appendix 1. This simplified manifest file describes the digital content in an eXtended Markup Language (XML) syntax, comprising a list of content in the form of time segments typically described between an opening tag (<SegmentList>) and a closing tag (</SegmentList>). The split into time segments notably enables a fine adaptation to bandwidth fluctuations. Each time segment corresponds to a certain duration ("duration" field) and is available at several quality levels. The manifest file is used to generate the address (URL—Uniform Resource Locator) of each time segment from its associated information in this file. This generation is done in this example using the elements "BaseURL" ("HTTP://server. com"), indicating the address of the content server, and "SegmentURL", listing the complementary parts of the addresses of the different time segments:

"C1_512 kb_1. mp4" for the first time segment of the content "C1" at 512 kilobits per second ("kb") in MPEG-4 ("mp4") format,
"C1_512 kb_2. mp4" for the second time segment,
etc.

Once it has the addresses of the time segments corresponding to the desired content, the service gateway 6 obtains these time segments by means of a streaming at these addresses. It will be noted that this streaming is traditionally done here through an HTTP URL, but that it could also be done through a universal address or URI (Universal Resource Identifier) describing another protocol (dvb://my-contentsegment for example).

It is assumed here that the HDMI key 8 is connected to the television set 5 by plugging into the HDMI port of the latter, and is used to restitute, on the screen of the television set 5, a content Cn (n being an integer representing the n-th content viewed), described in a manifest file 7. It will be noted that the content Cn can be a live or replayed television programme (such as a film, a series, a TV show, a commercial, etc.), or video on demand, or any other multimedia digital content.

In an example, a user wants to view a multimedia digital content, such as a film, on their television set 5 connected to an HDMI key 8. The HDMI key 8 is directly connected to the residential gateway 6 via WiFi®. As a variant, the HDMI key 8 could also be connected via WiFi® to another nomadic device of the domestic network, for example to the tablet 4 or to the smartphone 3, through which it could access the wide area communication network 1.

The HDMI key 8 can also be controlled by the user using the smartphone 3, on which a software application for controlling the HDMI key 8 is installed.

The content time segments obtained by the residential gateway 6 are, for example, transmitted via WiFi® to the HDMI key 8, that controls their display on the screen of the television set 5, for restitution to the user.

Figure 2:
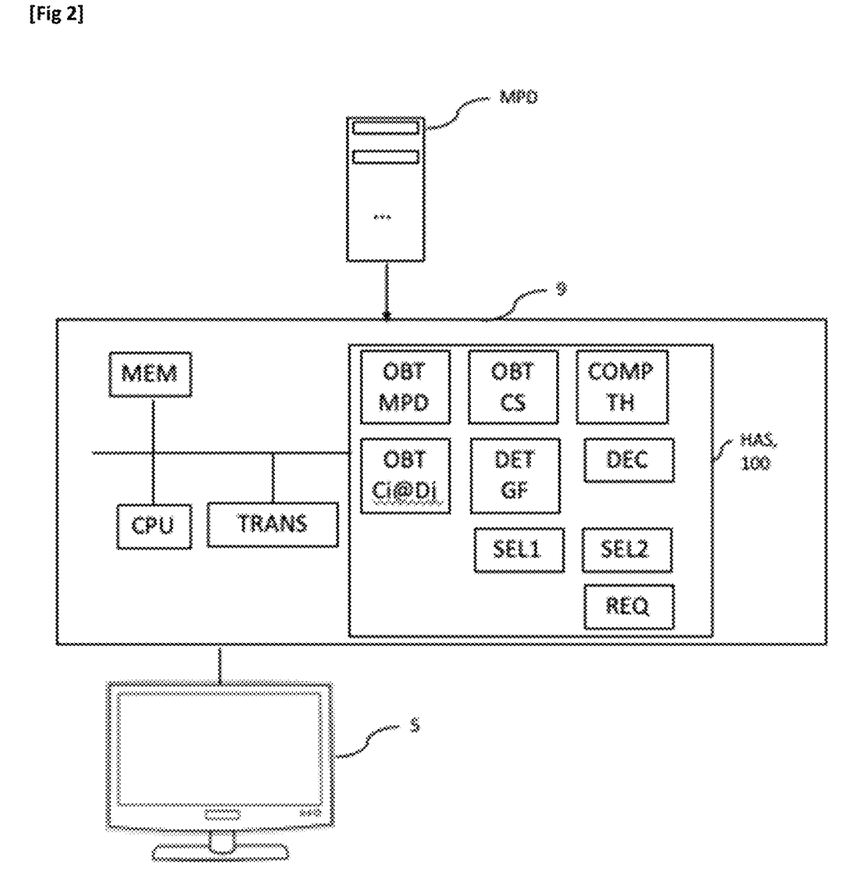
FIG. 2: diagrammatically shows the hardware structure of a multimedia stream player terminal integrating a device for managing progressive and adaptive streaming of digital content according to one embodiment of the invention.

FIG. 2 shows an architecture of a multimedia stream player terminal 9, or stream player 9, according to one embodiment of the invention. This stream player terminal 9 can be, for example, the HDMI key 8, or the smartphone 3 of FIG. 1. As a variant, this stream player 9 is integrated at an STB-type element associated with a television set (not shown). The example of the HDMI key 8 is described more specifically below.

The stream player terminal 9 typically comprises memories MEM associated with a processor CPU. The memories can be of type ROM (Read Only Memory), RAM (Random Access Memory) or Flash. The multimedia stream player 9 according to one embodiment of the invention can also contain a module TRANS for generating a command for displaying the streamed content to a content restitution device, for example the television set 5, and other modules (not shown) such as a hard disk for storing the time segments of the digital content, a module for controlling the access to the content, a module for processing the commands received from a remote control, or from a tablet, from a smartphone on which the application for controlling the stream player 9 is installed, thanks to which the user can control its operation, etc.

The multimedia stream player 9 further comprises a progressive and adaptive streaming device HAS 100, configured to request the adaptive streaming of one or more items of digital content Cn at one of the qualities proposed in its description file Mn (n being a non-null integer representing the n-th manifest file associated with the n-th content noted as Cn). This description file Mn can be stored, for example, in the memories MEM of the multimedia stream player 9 or on a remote server.

The device 100 comprises an obtaining module OBT. MPD of a description file of a digital content, a module OBT. Ci@Dj, where i=1 and j=1, of at least a first time segment of the digital content, a module OBT. CS for obtaining a connection speed CS of the player terminal 9 to the communication network from a size and a streaming time of at least one already streamed time segment. According to a first embodiment of the invention, the device 100 further comprises a module SEL1 for selecting a quality Dj for a subsequent time segment to be streamed depending on the connection speed CS and a ratio, called a gain factor, between an actual encoding bit rate of said already streamed time segment and its associated quality in the description file. It also comprises a module REQ for requesting the next time segment at the chosen quality. The device HAS, 100 thus implements the management method according to the invention that will be detailed below in relation to FIG. 3. According to another embodiment, the device 100 further comprises a module COMP for comparing the determined connection speed CS with a predetermined threshold TH, a module DEC for deciding on a mode for selecting a quality of a subsequent time segment to be streamed depending on the result of this comparison. When the determined connection speed is below the threshold, the device 100 is configured to implement the first module SEL1 for selecting a quality of a subsequent time segment to be streamed depending on the connection speed CS and a ratio, called a gain factor, between an actual encoding bit rate of said already streamed time segment and its associated quality in the description file. Otherwise, it controls the execution of a second selection module SEL2, configured to select the quality of the next segment depending on the connection speed CS alone. It thus implements the management method that will be detailed below in relation to FIG. 4.

In the example where the stream player terminal 9 is the HDMI key 8, it usually does not contain an input/output I/O interface module, and the I/O interface module of the user's smartphone 3 or of their tablet 4, or of the television set 5, is used by the latter to choose its content, for example.

Figure 3:
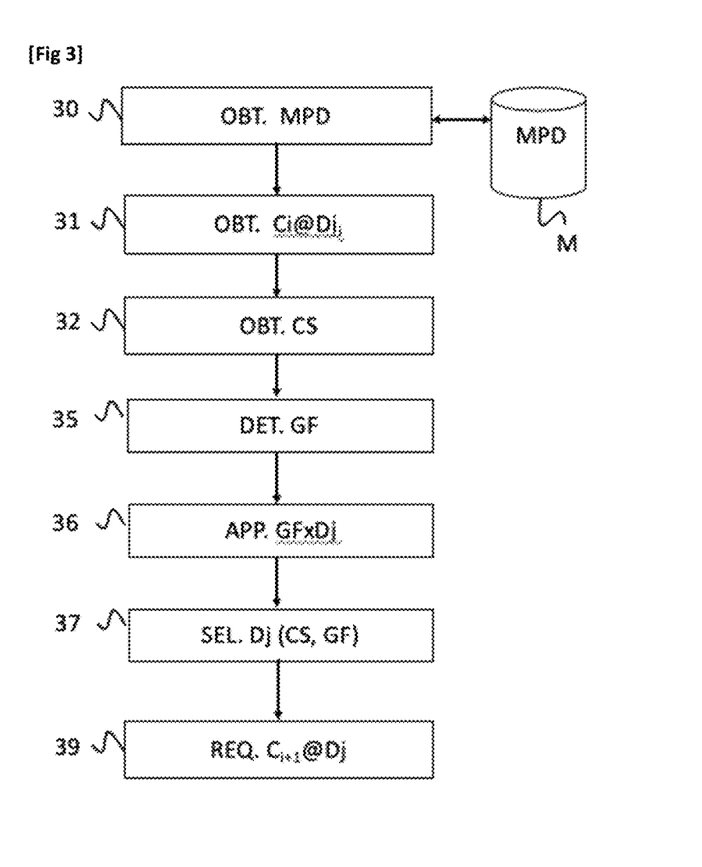
FIG. 3: describes in the form of a flowchart the steps of a method for managing progressive and adaptive streaming of digital content by a multimedia stream player terminal, associated with a restitution terminal, according to a first embodiment of the invention.

In relation to FIG. 3, a first embodiment of a method for managing progressive and adaptive streaming of digital content HAS by a multimedia stream player terminal according to one embodiment of the invention is now presented in the form of a flowchart.

In this example, the stream player terminal 9 according to FIG. 2 is the HDMI key 8 that controls the management of progressive and adaptive streaming of digital multimedia content and its restitution on the associated television set 5. The HDMI key 8 can be controlled via a remote control of the television set 5 or via a software controlling application of a smartphone 3 or the tablet 4.

According to the conventional HAS method, prior to the restitution of a digital content C, the user, via the association of the television set 5 and the HDMI key 8, sends a request, that transits through the home gateway 6 (not shown), indicating the chosen content to the "HAS" content server 2.

The "HAS" content server 2 then sends in response to this request a data stream representative of the chosen content via the domestic gateway 6 (not shown). The "HAS" content server 2 exposes a digital content C1 in the form of time segments or Ci@Dj "chunks" encoded at different encoding bit rates Dj, where the index i designates a time identifier, or position, of the Ci@Dj "chunk".

According to the previous art, the HAS client module is in charge of retrieving the time segments from the "HAS" content server 2 by choosing the video quality Dj according to the available network resource. Many algorithms allow the HAS client module to choose the encoding bit rate of the next video fragment to be streamed according to more or less secure or aggressive strategies. However, it is recalled that, more often than not, the general principle of such algorithms is based on streaming a first fragment at the lowest encoding bit rate proposed in the manifest, and evaluating the retrieving time of this first fragment. On this basis, the HAS streaming module determines, depending on the size of the fragment and its retrieving time, a connection speed CS to the communication network. It then evaluates whether this connection speed allows it to stream the next time segment at an encoding bit rate higher than the first one. Some algorithms are based on a gradual increase in the quality level of the streamed content fragments; others propose riskier approaches, with jumps in the encoding bit rate levels of the successive fragments.

In a standard case, if a video time segment duration is for example TS=2 seconds, the retrieval of the time segment by the HAS module should not exceed TT=2 seconds, in order to allow a uninterrupted restitution of the content. Therefore, the HAS module has to make the best compromise between the highest possible restitution quality, and thus encoding bit rate, and the streaming time of the time segment, that should be low enough to allow a continuous restitution on the television set 5 for example.

The invention proposes a new method for managing progressive and adaptive streaming of digital content by the device HAS, 100 which will now be detailed.

During a step 30, the device HAS, 100 retrieves the manifest file MPD to discover the available time segments of the digital content C, and the different associated video qualities Dj. In this example, the digital content C is for example proposed in the form of fragments of 4 s duration, with a first encoding bit rate D1=1,000 kbps, a second encoding bit rate D2=2,500 kbps, a third encoding bit rate D3=5,000 kbps, a fourth encoding bit rate D4=7,500 kbps and a fifth encoding bit rate D5=10,000 kbps. It is stored for example in a memory M of the device HAS, 100.

In the example considered, it is assumed that the device HAS, 100 uses an encoding variable bit rate VBR progressive and adaptive streaming mode and that qualities D1 to D4 indicated in the manifest MPD represent a peak cell rate PCR.

During a step 31, the device HAS, 100 streams a first time segment C1@$Dj_1$ at the lowest available quality $Dj_1$, with $j_1$=1, i.e. at an encoding bit rate of 1,000 kbps or 1 Mbps.

Once the streaming has been completed, it determines in 32 the size S of this first time segment and the time or duration TT of its streaming. It then calculates a connection speed CS to the network for this streaming, as follows: CS=S/TT.

In 35, the device HAS, 100 calculates an actual encoding bit rate R of the first streamed time segment C1@$Dj_1$ from the size S of this first time segment and its duration TS. This duration is known, for example indicated in the manifest MPD. It is assumed to be worth TS=2 s. R=S/TS is therefore obtained.

The device HAS, 100 then calculates a ratio, called a gain factor GF, between this actual encoding bit rate R of the first time segment and the quality D1. GF=R/D1 is obtained.

In the example considered, since the quality D1 represents an allowed encoding peak cell rate for encoding time segments of the digital content at this quality, the actual bit rate is necessarily less than or equal to D1. On average, the inventors observed it to be 50% lower than D1. The result is that the gain factor GF has a value of less than 1, for example of the order of 0.4.

In 36, the device HAS, 100 applies the gain factor GF to the qualities D1, D2 . . . DJ available for the next time segment of the content C1, i.e. it weights them by multiplying them by this gain factor GF.

In 37, it compares the weighted qualities D1xGF, D2xGF . . . DJxGF to the connection speed CS and chooses the one that fulfils both of the following criteria:
be lower than the connection speed CS; and
be closest to the connection speed CS.

In this way, the highest possible quality Dj is selected, taking into account both the connection speed CS of the player terminal 9 and the gain factor GF.

Advantageously, the connection speed CS values determined for each time segment can be averaged over a predetermined time window, for example with about ten previously streamed time segments. This results in a smoothed connection speed CS, less sensitive to local disturbances.

Likewise, the determination 35 of the gain factor can advantageously be based on several already streamed time segments. The result is an averaged or smoothed gain factor that is therefore less sensitive to bit rate differences between two consecutive time segments. This smoothing is particularly interesting in the case of progressive and adaptive streaming in VBR mode, for which the different available qualities associated with the time segments of the content C1 in the manifest file M1 indicate the encoding peak cell rate PCR. Indeed, since the variable bit rate VBR mode adapts to the content, the actual encoding bit rate can vary significantly from one time segment to the next, depending on the scene being filmed and the quantity of motion it contains. Thus, a smoothed gain factor provides more stability to the streaming management algorithm by avoiding inopportune jumps from one quality to another.

The different fragments streamed by the HAS client module are then transmitted during a step 39 to the television set 5 via the HDMI key 8, for example, for restitution to the user.

Steps 31 to 37 are then repeated as long as there are time segments left to be streamed for the digital content C.

Figure 4:
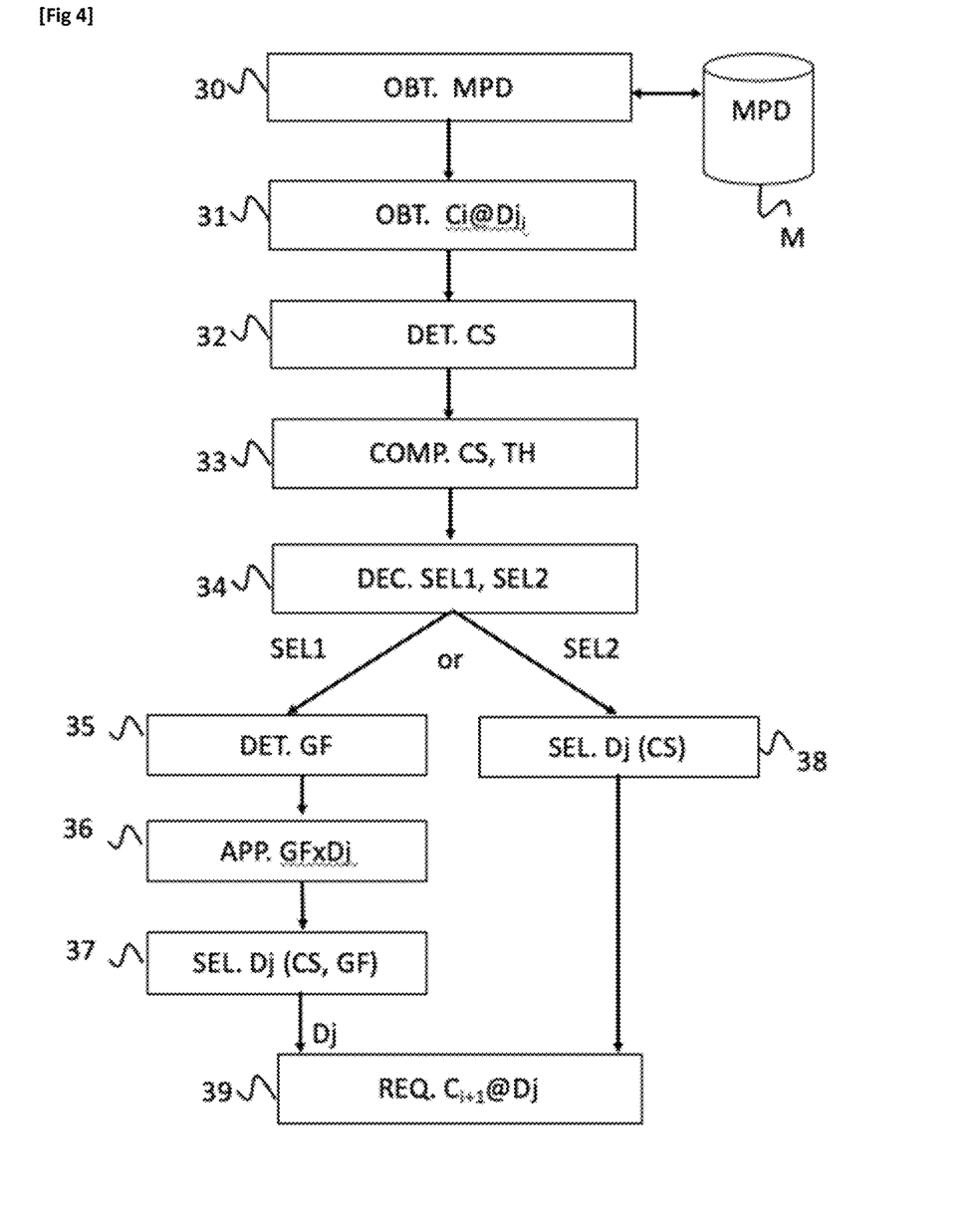
FIG. 4: describes in the form of a flowchart the steps of a method for managing progressive and adaptive streaming of digital content by a multimedia stream player terminal, associated with a restitution terminal, according to a second embodiment of the invention.

In relation to FIG. 4, a second embodiment of a method for managing progressive and adaptive streaming of digital content HAS by a multimedia stream player terminal according to another embodiment of the invention is now presented in the form of a flowchart.

In this second example considered, it is assumed again that the device HAS, 100 uses a progressive and adaptive streaming mode with an encoding variable bit rate VBR and that qualities D1 to D4 indicated in the manifest MPD represent a peak cell rate PCR.

Steps 31 and 32 are unchanged.

However, the management method includes an additional step 33 for comparing the obtained connection speed CS with a predetermined threshold TH. For example, this threshold is set to TH=5,000 kbps.

In 34, the device HAS, 100 decides on a mode SEL1, SEL2 for selecting a quality of at least one subsequent time segment $C1_2$ depending on the result of this comparison. If the connection speed CS of the player terminal is lower than the threshold TH, it chooses to implement a first selection mode SEL1, implementing the selection of a quality Dj depending on the connection speed CS and a gain factor GF, which has just been described in relation to FIG. 3. The next steps of the method, i.e. step 35 for determining a gain factor GF, followed by the steps 36 for weighting and 37 for selecting a quality Dj for the next Ci+1@Dj segment to be streamed, are unchanged and correspond to those in FIG. 3.

Otherwise, i.e. if the connection speed CS is greater than or equal to the threshold TH, the device HAS, 100 implements a second selection mode SEL2 in 38.

In this example, this selection mode SEL2 is classic and known in the prior art. In 38, the qualities D1 to D4 available for the next time segment of the content C are compared with the connection speed CS calculated in 32 and the quality Dj is chosen according to the same two criteria as above:

be lower than the connection speed CS; and
be closest to the connection speed CS.

According to this mode SEL2, the quality Dj chosen from the qualities available in the file M1 therefore depends only on the connection speed CS of the player terminal to the network.

The different fragments streamed by the HAS client module are then transmitted during a step 39 to the television set 5 via the HDMI key 8, for example, for restitution to the user.

Steps 31 to 39 are then repeated as long as there are time segments left to be streamed for the digital content C.

As an illustration, it is assumed that the connection speed CS calculated in 32 by the device HAS, 100 after streaming the first time segment is 4 Mbps. The first selection mode SEL1 is therefore chosen. The gain factor GF determined in $35_1$ is assumed to be 1.4. When dividing the quality D3=7.5 Mbps by the gain factor GF, 7.5×0.4=3 Mbps is obtained. Due to the weighting applied by the gain factor, the weighted value of this quality D3 becomes lower than the connection speed CS and therefore accessible for the player terminal. It is therefore chosen by the device HAS, 100 in $35_3$ for streaming the next time segment. According to the second selection mode SEL2, the available qualities D1, D2, D3, D4 are compared with the connection speed CS of 4 Mbps and the quality D2=2.5 Mbps is selected.

Thus, the first selection mode SEL1 of the invention allows to choose a quality Dj higher than the one authorised by the second selection mode SEL2 of the prior art.

In other words, the first selection mode SEL1 offers a better quality of the streamed content and thus an improved user experience, for an unchanged bandwidth consumption, provided that the progressive streaming method in VBR mode is based on a constant bit rate CBR of the same order as the encoding average bit rate ABR of a progressive streaming method in CBR mode, while the second selection mode SEL2 ensures a bandwidth consumption saving for an average quality of streamed content equivalent to the one produced by a progressive streaming method in CBR mode with an encoding average bit rate of the same value.

Thus, according to this second embodiment of the invention, the device HAS, 100 uses the connection speed CS to arbitrate between the new mode SEL1 for selecting a quality, more favourable to the user, and another selection mode SEL2, for example the conventionally used selection mode, more favourable to the service provider.

It is understood that the choice of the threshold value is strategic. The higher it is, the higher the share of users eligible to the first selection mode SEL1, which represents an increased cost in terms of bandwidth resources for the operator or the service provider. On the contrary, the lower it is, the more the service provider limits the share of users eligible to the first selection mode SEL1, and thus the greater the saving of bandwidth resources.

Today, a threshold value chosen around TH=5 Mbps seems to be a good compromise for a service provider that would like to offer their customers a more qualitative offering, while optimising the use of their network resources. Indeed, this threshold value TH can distinguish a first group of users subscribing to low-speed ADSL (Asymmetric Digital Subscriber Line) or more generally via a low-speed network access technology, therefore who generally only access the minimum available quality of a digital content, from a second group of users subscribing to high-speed ADSL or even better to fibre, who already access the maximum quality available for streaming a digital content. For users in the first group, the simple fact of accessing a higher quality level would already be noticeable with a positive impact on their experience. On the contrary, for users in the second group who already benefit from the best streaming quality, the implementation of the invention would not be noticeable, while it would save network resources for the service provider.

Thus, the invention is particularly adapted to HTTP adaptive streaming based on an encoding variable bit rate VBR, according to which the qualities associated with the time segments correspond to the encoding peak cell rate PCR.

It will be noted, however, that its scope is not limited to this mode. Indeed, it also applies to a progressive and adaptive streaming mode based on an encoding constant bit rate CBR. In this case, the qualities Dj indicated in the manifest MPD of the content C correspond to the encoding average bit rate ABR. This average bit rate is obtained over a long period of time, for example the entire duration of the video.

Since the encoding bit rate applied to the digital content is constant, the gain factor GF will take on values very close to 1, so that its application to quality values Dj will have little or no impact at all on the final decision made by the device HAS, 100.

The invention also applies to a progressive and adaptive streaming mode based on a encoding variable bit rate VBR, according to which the qualities associated with the time segments correspond to an encoding average bit rate ABR. This mode, as already mentioned, has no impact on the network load assumed by the service provider, compared to the HTTP adaptive streaming mode based on an encoding constant bit rate of the same value as ABR.

According to this mode, the gain factor GF of the invention could take on values well below 1, for example for segments corresponding to very animated scenes which encoding is much more expensive than the average bit rate. However, the gain factor GF will remain higher than the value of the ABR/PCR ratio. It is understood that the qualities Dj indicated in the manifest MPD of the content C will be increased due to the application of the gain factor GF greater than 1, which can result in the selection of a quality for streaming a subsequent segment that is lower than the one that would have been selected by a conventional selection mode, such as the second mode SEL2.

One advantage is that the blocking of the playback of the digital content is thus avoided, which ensures its smoothness. Indeed, for a smooth restitution, the player terminal should not take longer to stream the time segments than it takes to play them. Yet, the segments encoding an animated scene take longer to stream than the average and take up more of the player terminal's buffer memory.

The control provided by the invention thus makes it possible to preserve the quality of the restitution and thus of the user experience.

Figure 5:
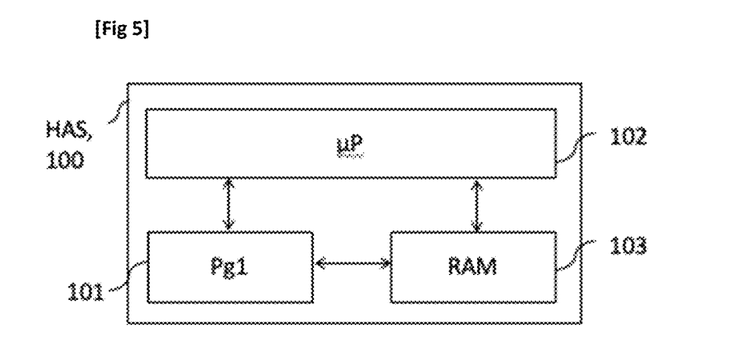
FIG. 5: diagrammatically shows the hardware structure of a device for managing progressive and adaptive streaming of digital content according to another embodiment of the invention.

In relation to FIG. 5, another example of a hardware structure of a device HAS, 100 for managing progressive and adaptive streaming of digital content within a multimedia stream player terminal connected to a communication network is finally presented, comprising, as illustrated in FIG. 2, at least one module OBT CS for obtaining a connection speed CS to the communication network determined from a size and a streaming time of at least one already streamed time segment, one module DET GF for determining a ratio, called a gain factor GF, between an actual encoding bit rate R of said already streamed time segment et the quality Dj associated with said time segment in the description file and one module SEL1 for selecting, for at least one subsequent time segment to be streamed, a maximum quality of the digital content, depending on the connection speed and the gain factor GF.

Advantageously, the device HAS, 100 further comprises a module COMP for comparing the connection speed at a predetermined threshold TH and a module DEC for deciding on a mode for selecting the quality of the next time segment depending on a result of the comparison, the selection module SEL1 being executed when the connection speed is below said predetermined threshold, otherwise the module SEL2 being executed. It also comprises a module REQ for requesting the streaming of the next time segment at the chosen quality.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device HAS, 100 comprises a random access memory 103 (a RAM memory, for example), a processing unit 102 equipped for example with a processor and controlled by a computer program Pg, representative of the comparison and selection modules, stored in a read-only memory 101 (a ROM memory or hard disk, for example). At initialisation, the code instructions of the computer program are for example loaded into a random access memory 103 before being executed by the processor of the processing unit 102. The random access memory 103 can also contain the description file MPD, previously streamed time segments, the connection speed and the gain factor.

FIG. 5 only shows a particular one of several possible ways of realising the device HAS, 100 so that it executes the steps of the method for managing HTTP adaptive streaming of digital content within a multimedia stream player terminal connected to a communication network as detailed above, in relation to FIGS. 3 and 4 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device HAS, 100 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The different embodiments have been described above in relation to a device 100 integrated into a multimedia stream player terminal connected to a wireless telecommunications network, such as for example an element STB or an HDMI key, but it can also be integrated into the terminal TU itself, that can be a mobile phone of the type smartphone, a PC computer or a tablet.

According to an embodiment variant of the invention illustrated in FIG. 2, the device 100 is based on the hardware structure of the player terminal, that here has the hardware structure of a computer and more particularly comprises a processor, a random access memory, a read-only memory, a non-volatile flash memory as well as wireless communication means that enable it to communicate with the player terminal and the digital content server via the communication network. The read-only memory is a storage medium compliant with the invention, readable by the processor and having the computer program Pg1 compliant with the invention recorded thereon, comprising instructions for implementing the method for managing HTTP adaptive streaming of digital content within the player terminal according to the invention.

The invention that has just been described in its different embodiments has many advantages. In particular, the new mode for selecting the quality of a time segment to be streamed that it proposes makes it possible to adapt more finely to the bandwidth available to the user. Moreover, reserving the benefit of this new selection mode to users with a low-speed network connection, in any case with a connection speed below a predetermined threshold, allows the service provider to offer a better image quality to users with a poor network connection, while optimising the bandwidth consumption for users with a higher-speed connection.

```
<?xml version="1.0"?>
<MPD xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011
    DASH-MPD.xsd"
    type="dynamic" profiles="urn:mpeg:dash:profile:isoff-live:2011">
<Representation id="0" codecs="avc1" mimeType="video/mp4"
width="1024" height="768" startWithSAP="1" bandwidth="46986">
<BaseURL>HTTP://server.com/</BaseURL>
<!-- Contenu C1 à N1=512kb -->
<SegmentBase>
    <Initialization
        sourceURL="C1_15sec_512kb/C1_512kbit_dash.mp4"/>
</SegmentBase>
<SegmentList duration="10">
    <SegmentURL media="C1_512kb_1.mp4"/>
    <SegmentURL media=" C1_512kb_2.mp4"/> ....
</SegmentList>
<!-- Contenu C1 à N2=1024kb -->
<SegmentBase>
    <Initialization
        sourceURL="C1_15sec_500kbit/C1_1024kbit_dash.mp4"/>
</SegmentBase>
<SegmentList duration="10">
    <SegmentURL media="C1_512kb_1.mp4"/>....
</SegmentList>
<!-- Contenu C1 à N3=2048kb -->
<SegmentBase>
    <Initialization
        sourceURL="C1_15sec_512kb /C1_2048kbit_dash.mp4"/>
</SegmentBase>
<SegmentList duration="10">
    <SegmentURL media="C1_2048kb_1.mp4"/>...
</SegmentList>
<!-- Contenu C2 à N1=512kb -->
<SegmentBase>
    <Initialization
        sourceURL=" C2_15sec_500kbit/C2_512kbit_dash.mp4"/>
</SegmentBase>
<SegmentList duration="10">
    <SegmentURL media=" C2_512kb_1.mp4"/> ....
</SegmentList>
<!-- Contenu C2 à N2=1024kb -->
<SegmentBase>
    <Initialization
        sourceURL="C2_15sec_500kbit/C1_1024kbit_dash.mp4"/>
</SegmentBase>
<SegmentList duration="10">
    <SegmentURL media="C2_1024kb_1.mp4"/>....
</SegmentList>
<!-- Contenu C2 à N3=2048kb -->
<SegmentBase>
    <Initialization
        sourceURL="C2_15sec_500kbit/C1_2048kbit_dash.mp4"/>
</SegmentBase>
<SegmentList duration="10">
    <SegmentURL media="C1_2048kbit_1.mp4"/>...
</SegmentList>
    ....
</SegmentList>
</MPD>
```

The invention claimed is:

1. A method for managing progressive and adaptive streaming of digital content within a multimedia stream player terminal connected to a communication network, said digital content being associated with a description file of said digital content, comprising a list of time segments of said content each associated with several encoding bit rates corresponding to several qualities, wherein said method comprises:
   obtaining a connection speed to a communication network determined from a size and a streaming time of at least one already streamed time segment, and
   selecting, for at least one subsequent time segment to be streamed, a maximum quality of the content, depending on the connection speed and a ratio, called a gain factor, between an actual encoding bit rate of said already streamed time segment and an encoding bit rate corresponding to a quality of the several qualities, which is associated with said already streamed time segment in the description file.

2. The method for managing progressive and adaptive streaming of digital content according to claim 1, wherein the connection speed is compared with a predetermined threshold and wherein the selecting comprises executing the selecting in response to the connection speed being below said predetermined threshold.

3. The method for managing progressive and adaptive streaming of digital content according to claim 2, wherein the selecting further comprises selecting a maximum quality of the content depending on the connection speed alone in response to the connection speed being above the predetermined threshold.

4. The method for managing progressive and adaptive streaming of digital content according to claim 2, wherein the selecting a quality for at least one subsequent time segment to be streamed further comprises, in response to the connection speed being below said predetermined threshold:
   weighting the qualities associated with the time segments in the description file by the gain factor;
   comparing the weighted qualities with the connection speed, the quality which weighted value is both lower than and closest to the connection speed being chosen.

5. The method for managing progressive and adaptive streaming of digital content according to claim 1, wherein the method comprises averaging the gain factor over a plurality of successively streamed time segments.

6. The method for managing progressive and adaptive streaming of digital content according to claim 1, wherein said digital content is encoded with an encoding variable bit rate and said theoretical encoding bit rate associated with a time segment in the description file is an allowed peak cell rate.

7. The method for managing progressive and adaptive streaming of digital content according to claim 1, wherein said digital content is encoded with an encoding fixed bit rate and the qualities associated with a time segment in the description file are encoding average bit rates.

8. The method for managing progressive and adaptive streaming of digital content according to claim 1, wherein said digital content is encoded with an encoding variable bit rate and the qualities associated with a time segment in the description file are encoding average bit rates.

9. A non-transitory computer-readable storage medium with a computer program recorded thereon comprising program code instructions for managing progressive and adaptive streaming of digital content within a multimedia stream player terminal connected to a communication network, when the program is executed by a processor, said digital content being associated with a description file of said digital content, comprising a list of time segments of said content each associated with several encoding bit rates corresponding to several qualities, wherein the program code instructions configure the processor to:

obtain a connection speed to a communication network determined from a size and a streaming time of at least one already streamed time segment, and select, for at least one subsequent time segment to be streamed, a maximum quality of the content, depending on the connection speed and a ratio, called a gain factor, between an actual encoding bit rate of said already streamed time segment and an encoding bit rate corresponding to a quality of the several qualities, which is associated with said already streamed time segment in the description file.

10. A device for managing progressive and adaptive streaming of digital content within a multimedia stream player terminal connectable to a communication network, said digital content being associated with a description file of said digital content, comprising a list of time segments of said content each associated with several encoding bit rates corresponding to several qualities, wherein said device comprises:

a processor; and a non-transitory computer-readable medium comprising program code instructions stored thereon which when executed by the processor configure the device to:

obtain a connection speed to a communication network from a size and a streaming time of at least one already streamed time segment, and select, for at least one subsequent time segment to be streamed, a maximum quality of the content, depending on the connection speed and a ratio, called a gain factor, between an actual encoding bit rate of said already streamed time segment and an encoding bit rate corresponding to a quality of the several qualities, which is associated with said already streamed time segment in the description file.

11. A multimedia stream player terminal configured to connect to a communication network, and which comprises the device for progressive and adaptive streaming of digital content according to claim 10.

* * * * *